June 26, 1951 E. T. TURNER 2,558,501
AIRCRAFT PROPELLER ROTATABLE ABOUT THE EXTERNAL
PERIPHERY OF THE AIRCRAFT BODY
Filed June 14, 1947 10 Sheets-Sheet 1
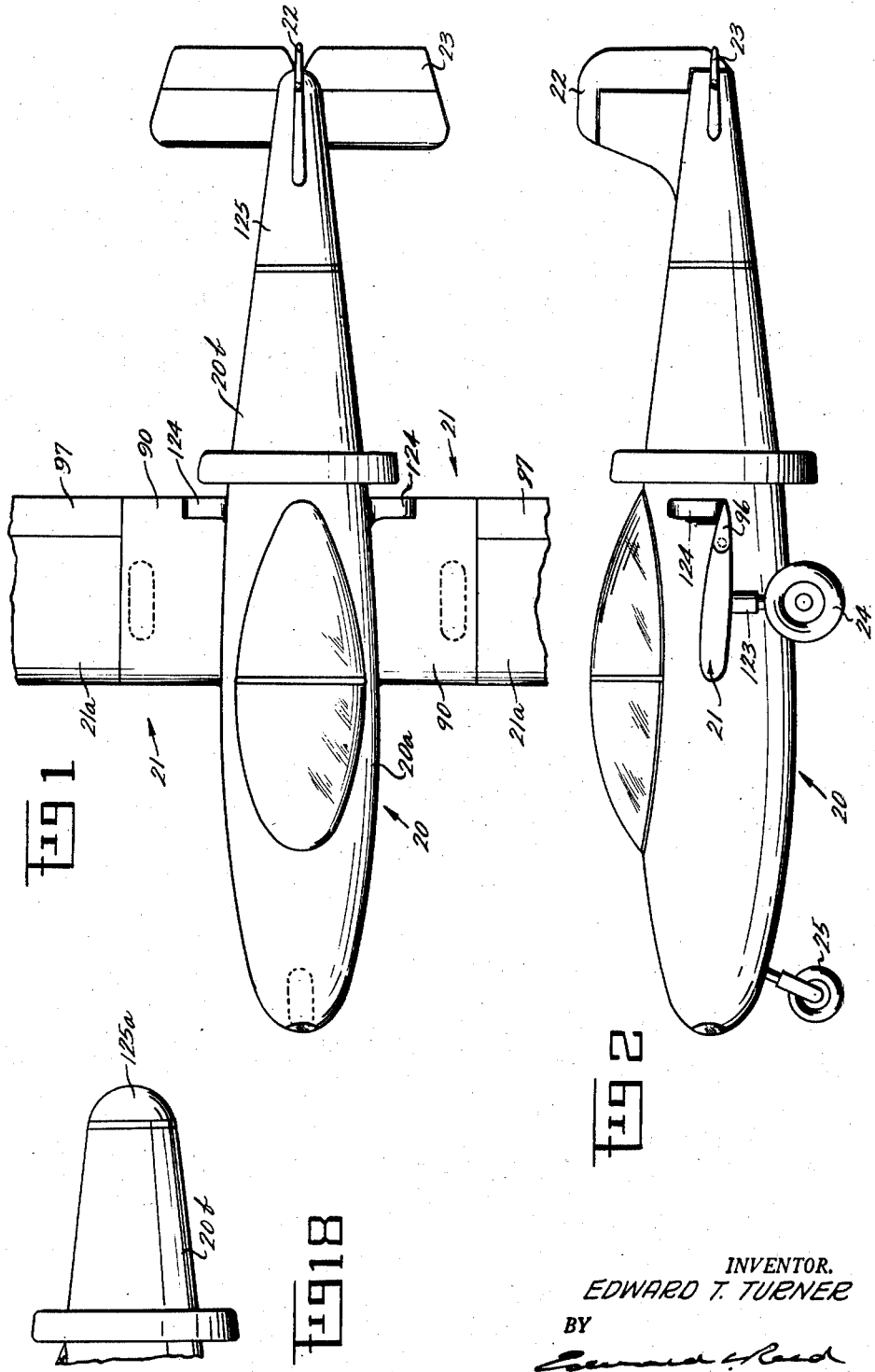
INVENTOR.
EDWARD T. TURNER
BY
ATTORNEY

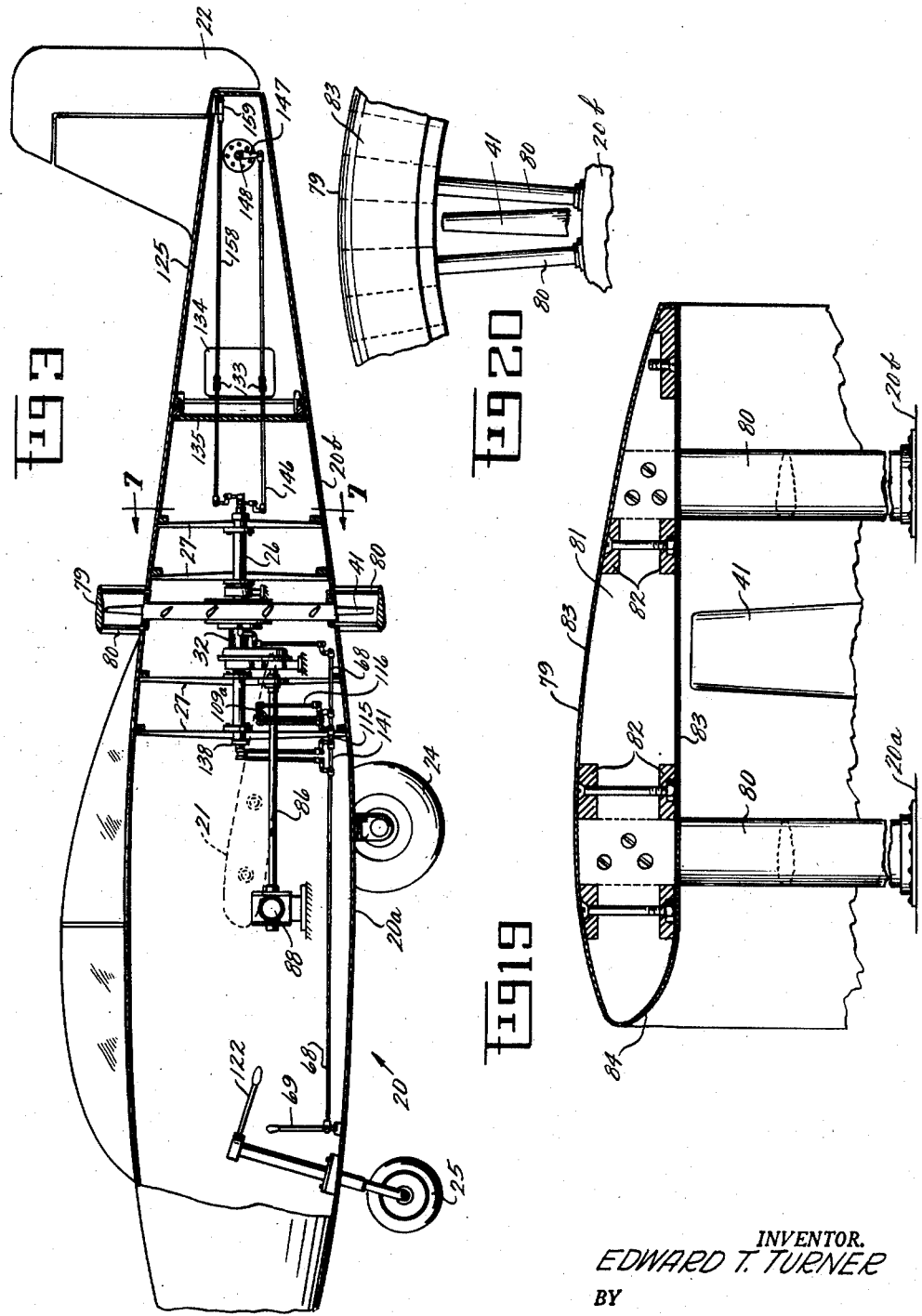

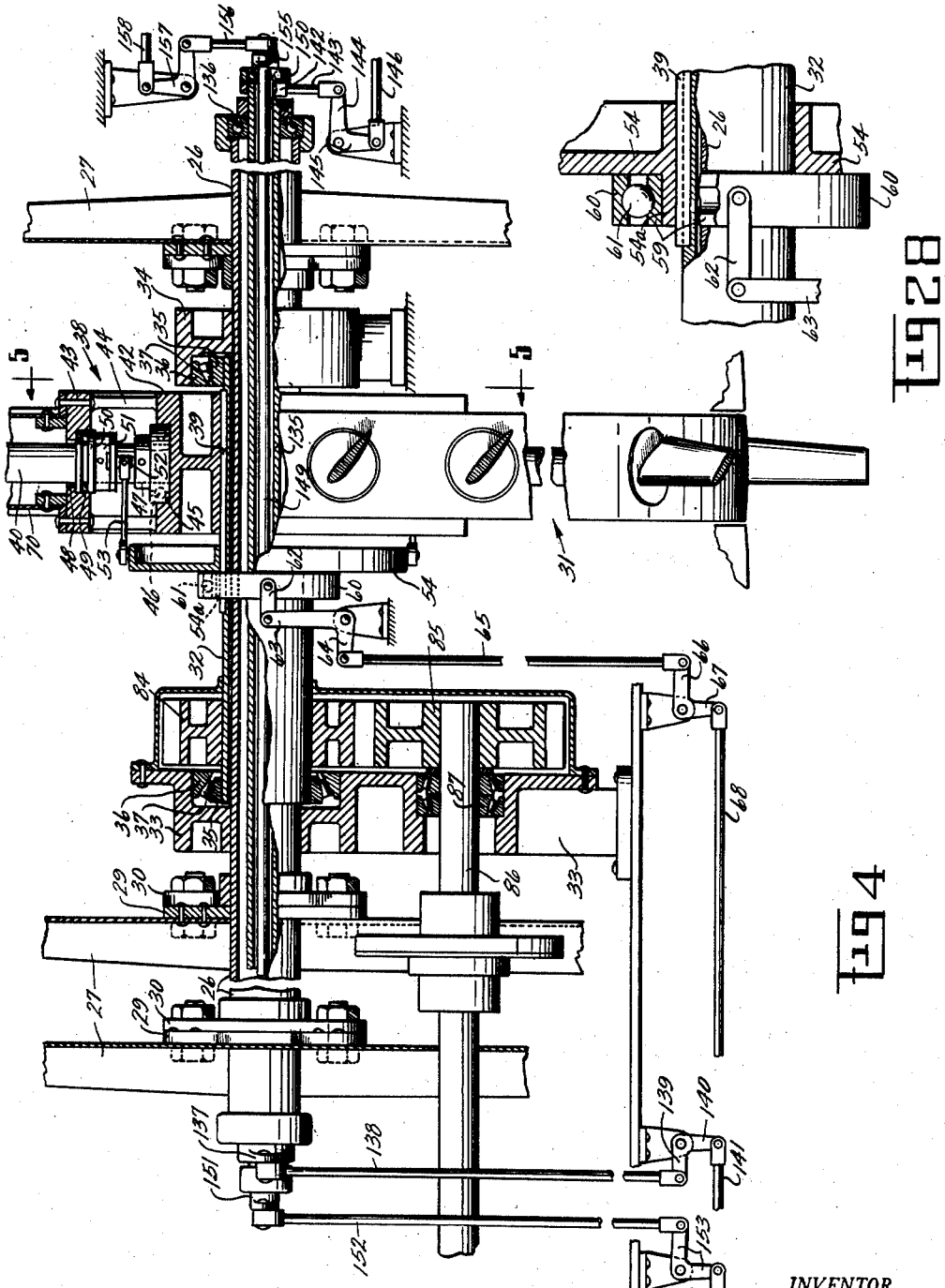

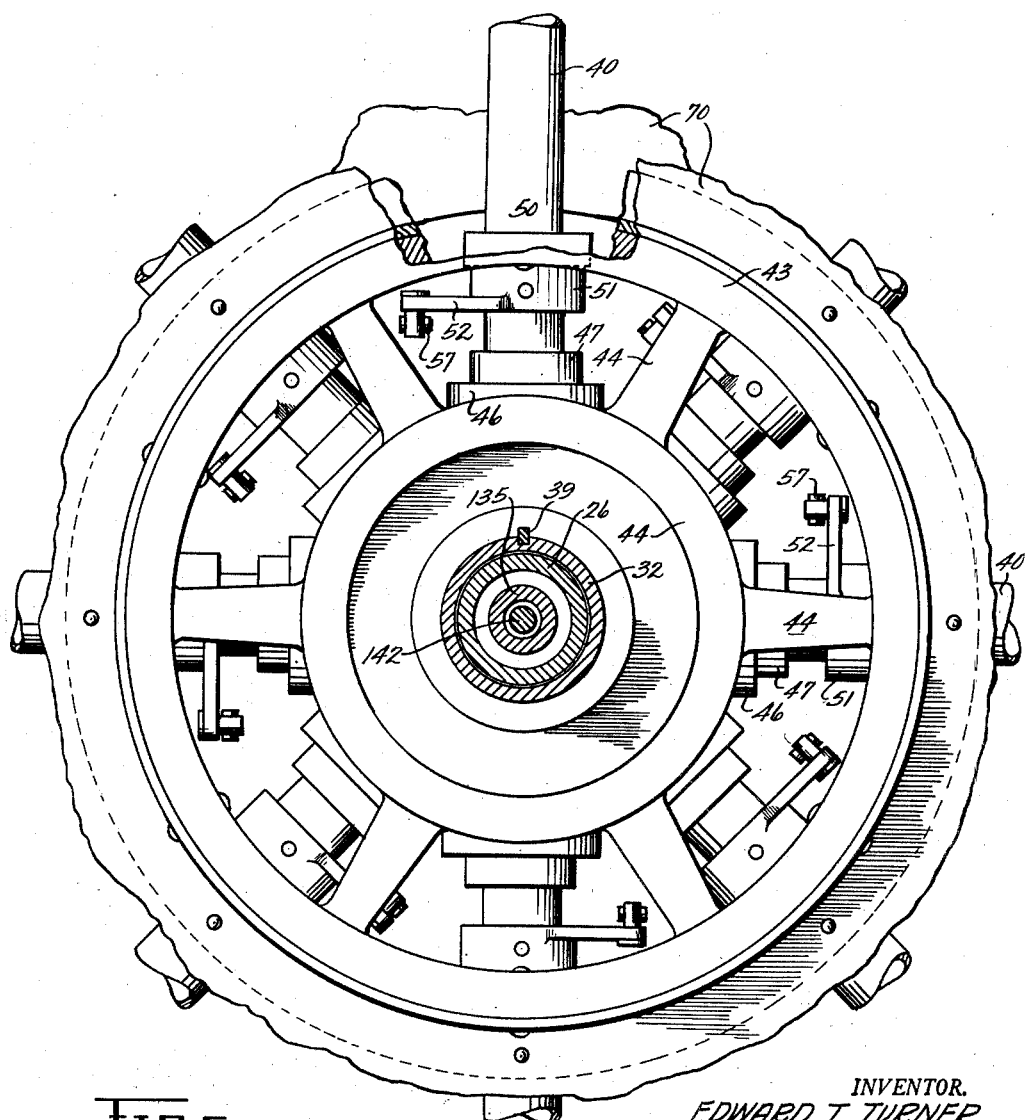

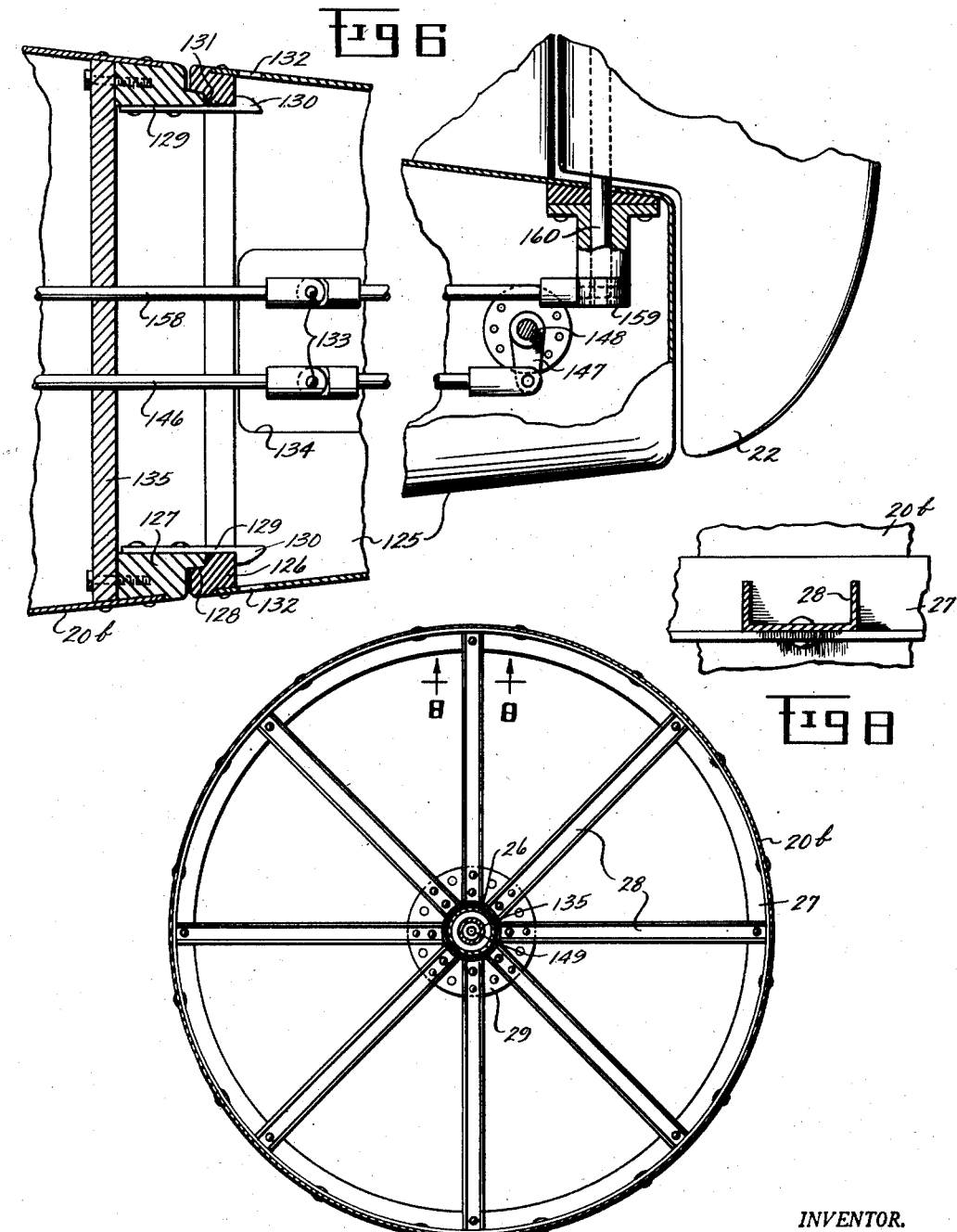

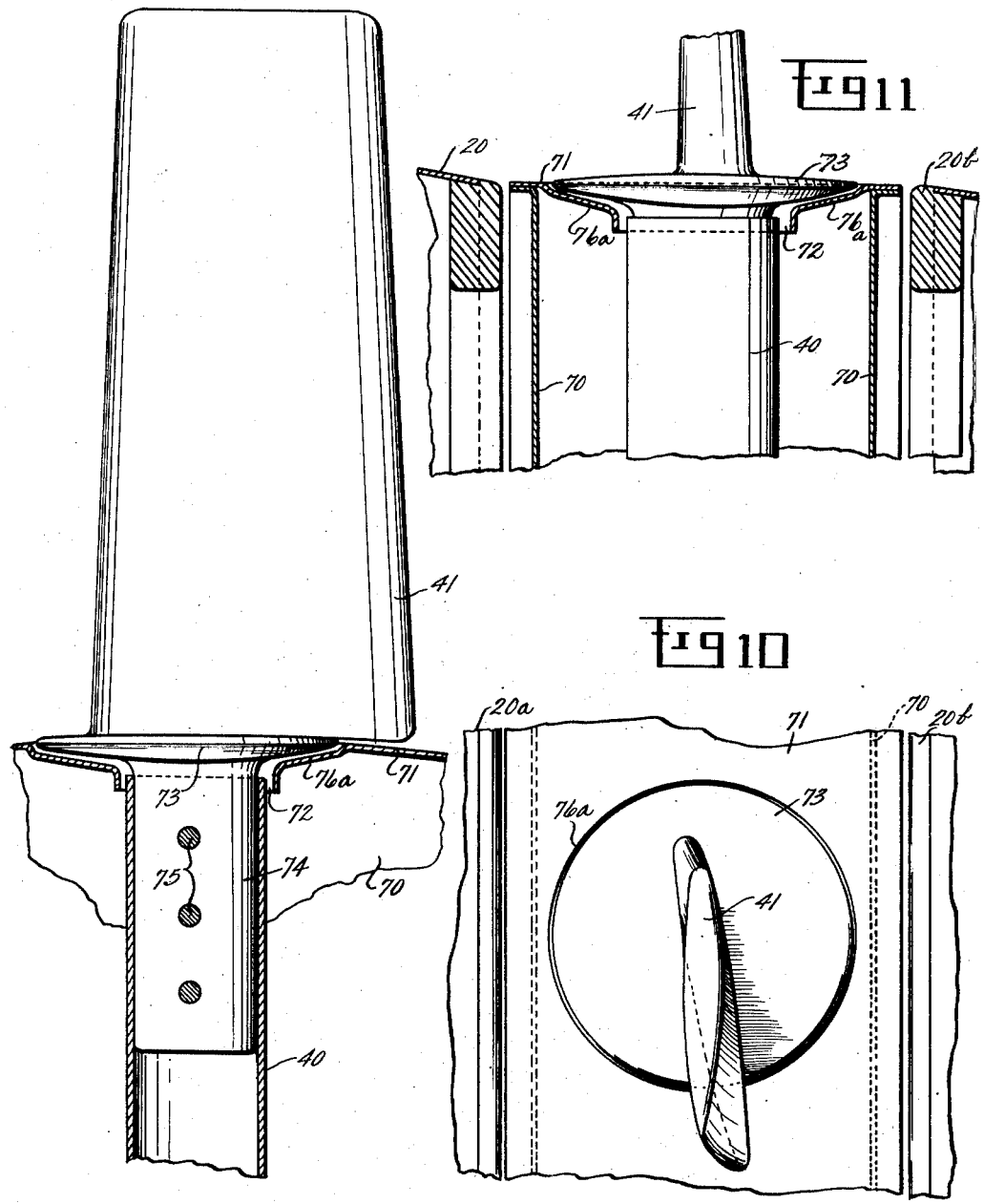

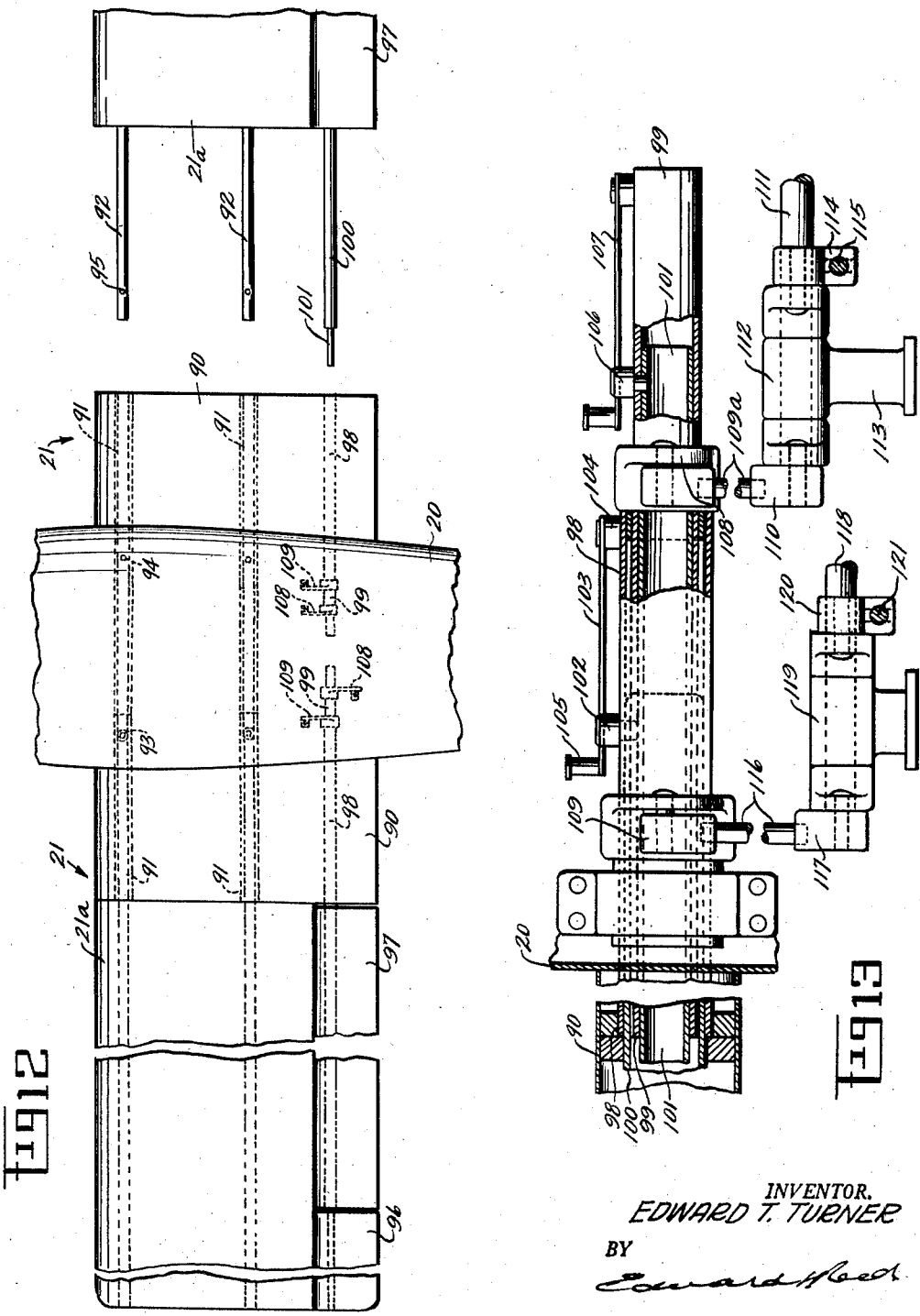

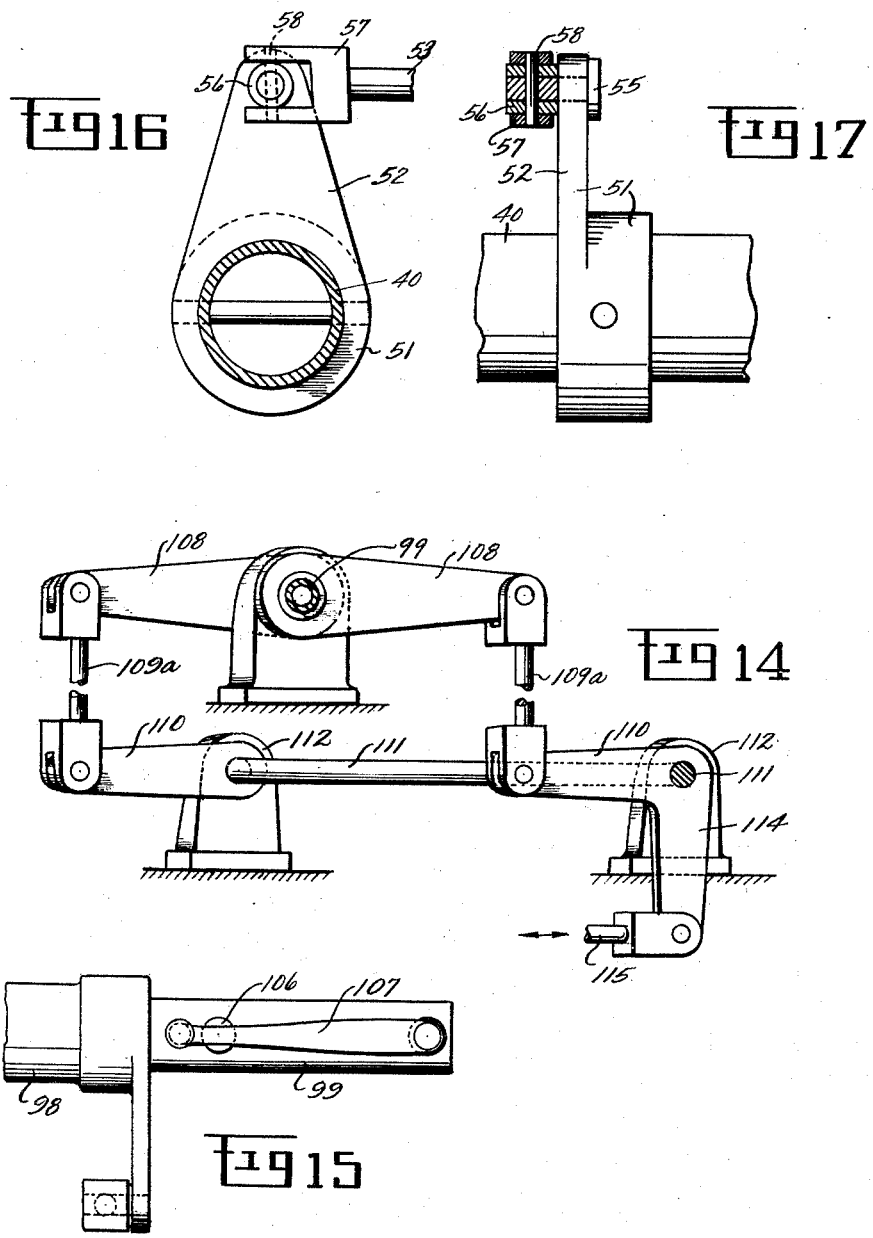

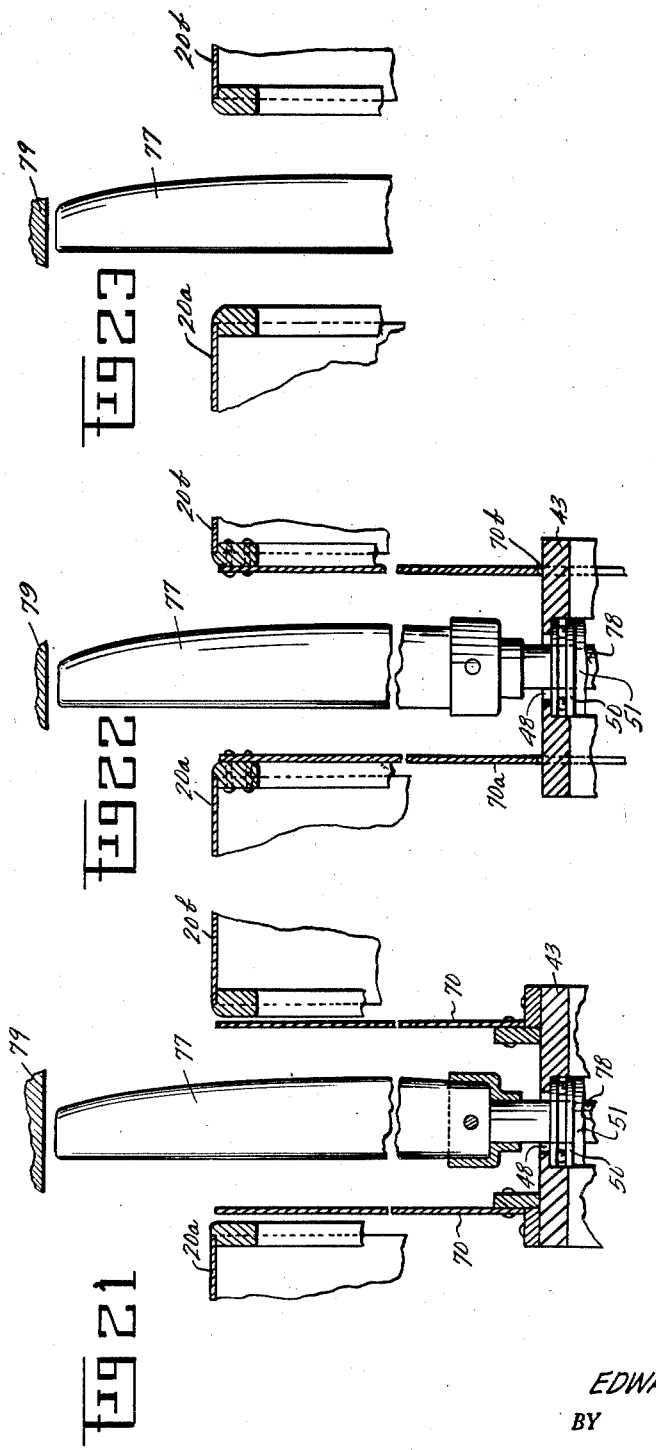

June 26, 1951  E. T. TURNER  2,558,501
AIRCRAFT PROPELLER ROTATABLE ABOUT THE EXTERNAL
PERIPHERY OF THE AIRCRAFT BODY
Filed June 14, 1947  10 Sheets-Sheet 10
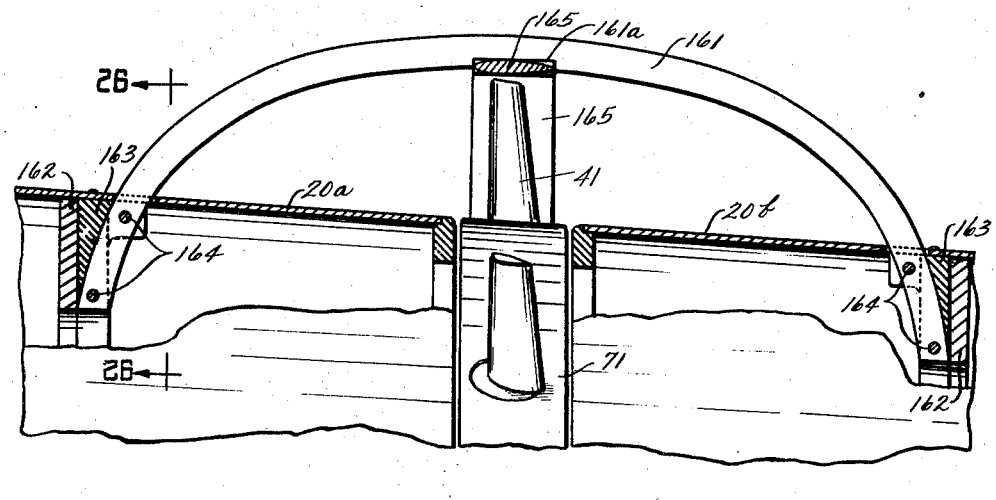
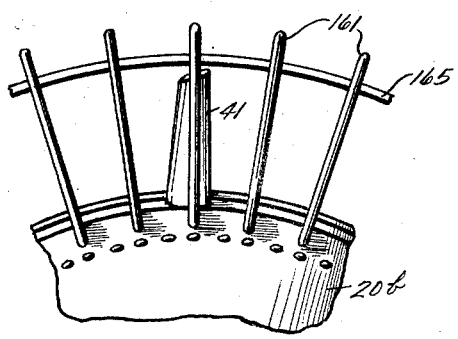
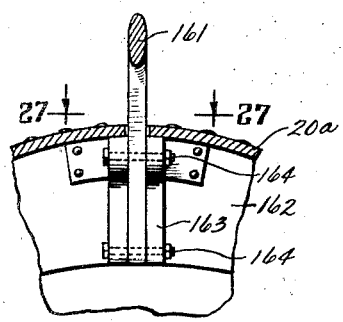
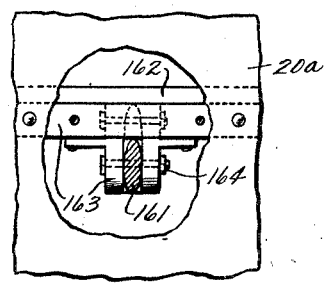
INVENTOR.
EDWARD T. TURNER
BY
ATTORNEY—

Patented June 26, 1951

2,558,501

UNITED STATES PATENT OFFICE 2,558,501

AIRCRAFT PROPELLER ROTATABLE ABOUT THE EXTERNAL PERIPHERY OF THE AIRCRAFT BODY

Edward T. Turner, Dayton, Ohio; Edward T. Turner, Jr., administrator of said Edward T. Turner, deceased, assignor to Charline Elizabeth Turner Application June 14, 1947, Serial No. 754,608

6 Claims. (Cl. 244—67)

This invention relates to a self propelled vehicle and more particularly to a combined land vehicle and airplane.

One object of the invention is to provide such a vehicle which can be transformed from an airplane into a land vehicle, or vice versa, by the removal or attachment of parts which can be quickly and easily attached to and removed from the vehicle.

A further object of the invention is to provide such a vehicle which when in condition for operating on land can be stored in the ordinary private automobile garage.

A further object of the invention is to provide such a vehicle which is propelled both in the air and on land by the same propeller.

A further object of the invention is to provide such a vehicle in which the propeller is so located as to create a minimum of hazard when the vehicle is operated on land.

A further object of the invention is to provide such a vehicle in which the propeller is mounted in the body of the vehicle in spaced relation to both ends thereof.

A further object of the invention is to provide such a vehicle having demountable wings and devices for actuating the relatively movable parts of the wings which can be quickly and easily connected with or disconnected from their controlling mechanisms when the wings are mounted on or are removed from the vehicle.

A further object of the invention is to provide a vehicle of simple efficient construction and of attractive appearance, both as an airplane and as a land vehicle, and which can be produced at a relatively low cost.

Other objects of the invention may appear as the vehicle is described in detail.

In the accompanying drawings Fig. 1 is a top plan view of a vehicle embodying the invention with the wings partly broken away; Fig. 2 is a side elevation of such a vehicle; Fig. 3 is a section taken longitudinally through such a vehicle, partly broken away and partly in elevation; Fig. 4 is a view of the connecting structure between the two parts of the body, and the propeller mounting, partly in section and partly in elevation; Fig. 5 is a transverse sectional view taken on the line 5—5 of Fig. 4; Fig. 6 is a sectional view, partly broken away, showing the detachable connection between the tail structure and the main portion of the body; Fig. 7 is a transverse section taken on the line 7—7 of Fig. 3; Fig. 8 is a section taken on the line 8—8 of Fig. 7; Fig. 9 is a detail view, partly in section, of the outer portion of one of the propeller blades; Fig. 10 is an end elevation of one of the propeller blades; Fig. 11 is a sectional view showing the device for controlling circulating windage; Fig. 12 is a top plan view, partly broken away, showing the connections between the demountable wings and the body; Fig. 13 is a detail view, partly in section and partly in elevation, showing the connections between the aileron and flap operating shafts and their actuating mechanisms; Fig. 14 is a perspective, partly broken away, of the connecting means between the aileron operating shaft and the actuating mechanism therefor; Fig. 15 is a plan view of a locking device between rotatable parts of the connecting mechanism; Fig. 16 is a section through one of the blades showing the connection between the crank arm and the pitch controlling device; Fig. 17 is a side elevation of the device shown in Fig. 16, partly in section; Fig. 18 is an elevation of the rear portion of the body with the tail structure removed and a closing cap on the end of the body; Fig. 19 is an enlarged sectional view through the blade guard; Fig. 20 is a side elevation of a portion of the blade guard; Figs. 21, 22 and 23 are sectional details showing a modified form of blade and the shields therefor; Fig. 24 is a longitudinal section through a portion of the body showing an exterior connecting structure for the two parts of the body; Fig. 25 is a rear elevation of the exterior connecting device; Fig. 26 is a sectional detail showing the means for attaching one of the connecting bars with the body; Fig. 27 is a section taken on the line 27—27 of Fig. 26; and Fig. 28 is a detail, partly in section, of the connection between the variable pitch mechanism and its operating device.

In these drawings I have illustrated one embodiment of my invention, with minor modifications thereof, but it is to be understood that the vehicle as a whole, as well as the several parts thereof, may take various forms without departing from the spirit of the invention.

In that embodiment of the invention here illustrated the vehicle comprises an elongate and preferably streamlined body 20 which is provided with demountable wings 21, with a vertical rudder 22 and with elevators 23. The body is provided with a three point landing gear comprising a pair of wheels 24 below the wings and a single front wheel 25 and this landing gear also constitutes running gear for the vehicle when it is operated on land. The propeller is mounted in the body, preferably in the rear of the wheels 24, and the blades thereof extend through and rotate in a circumferential opening extending entirely about the body. To provide this circumferential opening the body is divided transversely into two parts, 20a and 20b, and these parts are rigidly connected one with the other in longitudinally spaced relation and in such a maner as to rigidly support the two parts in alined positions without obstructing the space between the two parts, thus permitting the propeller to be mounted within the body and to rotate freely in the space between the two parts thereof.

The two parts of the body may be connected one with the other in any suitable manner which will provide an unobstructed space between the same. In the construction shown, more particularly in Figures 3 and 4, an elongate connecting member 26, preferably tubular in form, extends across the space between the two parts of the body and is rigidly supported at its ends in the respective parts of the body. The connecting member and its mountings are of such strength and rigidity as to rigidly support the two parts of the body and prevent all relative movement thereof. The mountings for the end portions of the connecting member may take various forms but preferably two circular structures are mounted in each part of the body in spaced relation one to the other and provided with means to receive and support the end portions of the connecting member. As shown more particularly in Figures 3 and 7 each circular mounting comprises an annular member 27 arranged within and rigidly connected with the body of the vehicle. The annular member 27 is connected by radial spokes 28 with a hub member 29 adapted to receive the connecting member 26. The hub portion 29 of each mounting is rigidly secured to the connecting member, as by bolting the same to a flanged collar 30 secured to the connecting member and preferably welded thereto.

The propeller, which is indicated as a whole by the reference numeral 31, is mounted about the connecting member 26 for rotation in the plane of the opening between the two parts of the body and the outer portions of the several blades of the propeller project beyond the body a distance sufficient to provide the desired propulsion of the vehicle. In the arrangement shown a tubular propeller shaft 32 is mounted about the connecting member 26 and is rotatably supported without frictional contact with the connecting member. As here shown the end portions of the propeller shaft are mounted in bearings carried by brackets 33 and 34 mounted on fixed parts of the body structure. Each of the bearings comprises an inner race 35 rigidly secured to the propeller shaft, an outer race 36 rigidly secured to the supporting bracket and tapered rollers 37 mounted between the two races. The rollers of the two bearings preferably slope in opposite directions so that the bearings constitute thrust bearings as well as journal bearings.

The propeller comprises a hub 38 which is rigidly secured to the propeller shaft 32, as by a key 39. The propeller may be provided with any desired number of blades, in the present instance 8, which may be of any suitable character and may be mounted on the propeller by any suitable means. In the arrangement shown in Figures 4, 9, 10 and 11 each blade comprises a shank 40 which is mounted in the hub 38 and extends radially therefrom to a point adjacent the wall of the body and is there rigidly secured to the outer or propelling portion 41 of the blade, which projects beyond the body and may be positioned entirely beyond the body. The propeller is preferably of the variable pitch type and, in the present instance, the pitch may be varied to such an extent as to impart reverse movement to the vehicle when operating on land. Therefore, the shank 40 of the propeller is mounted in the hub 38 for rotation about its longitudinal axis. In the form here shown the hub comprises an inner portion 42 and an outer portion 43 spaced radially from the inner portion and connected therewith in spaced relation thereto by connecting members or standards 44 of narrow width. The inner portion 42 of the hub is provided with a recess 45 to receive the inner end of the blade shank and when, as in the present instance, the shank is to rotate about a longitudinal axis an anti-friction bearing 46 is mounted in the recess 41 and the end of the shank is mounted in the inner race of the bearing, a collar 47 being pinned or otherwise secured to the shank 40 in contact with the inner race of the bearing. The outer portion 43 of the hub is provided with an opening 48 through which the shank extends and the inner portion of the opening is enlarged to provide a recess 49 in which an anti-friction thrust bearing 50 is mounted, the outer race of the bearing engaging the shoulder at the outer end of the recess, and the inner race being supported on a collar 51 secured to the shank of the blade. Thus the blade rotates freely in the bearings in the hub and the thrust bearing 50 opposes the centrifugal force on the blade and holds the latter against outward movement.

The blades may be moved about their longitudinal axes, to vary the pitch thereof, in any suitable manner. In the present arrangement there is rigidly secured to each collar 51 a crank arm 52 which is connected by a link 53 with a collar 54 which is mounted on the propeller shaft 32 for axial movement with relation thereto, and for rotation therewith. Each link 53 is pivotally mounted at its outer end on the collar 54 and is connected at its inner end with the corresponding crank arm for movement about intersecting axes so that the link may adjust itself with relation to the crank arm. As shown in Figures 16 and 17 a headed pivot pin 55 is rotatably mounted in the crank arm 52 and a sleeve or collar 56 is mounted on that end of the pin 55 opposite the head of the latter. A yoke 57 rigidly secured to the link 53 receives the sleeve 56 and is pivotally connected to the sleeve and the pivot pin 55, as by a pin 58. The axially movable collar 54 is, in the present instance, splined to the shaft 32 by a projecting portion of the key 39 which connects the hub with the propeller shaft. Mounted about the propeller shaft 32 on the outer side of the collar 54 is an annular member 59 which is connected with the shaft for rotation therewith and is here shown as secured to the outer portion of the hub 54a of the collar 54. Mounted about the annular member 59 is a second annular member 60, the two members having opposed ball races in which are mounted bearing balls 61. The balls 61 hold the annular members 59 and 60 against relative axial movement and permit the inner annular member 59 to rotate with the collar 54 and the shaft. Axial movement may be imparted to the members 59 and 60 and the collar 54 in any suitable manner to impart rotary movement to the blade. As here shown a link 62 is pivotally connected with the annular member 60 and with one arm 63 of a bell crank. The other arm 64 of the bell crank is connected by a link 65 with the arm 66 of a second bell crank, the other arm 67 of which is pivotally connected with a forwardly extending rod 68 which is connected at its forward end with a suitable actuating device, such as a lever 69. It may be noted here that there are a series of actuating devices or levers 69 arranged in line transversely to the body and connected with separate actuating rods which are substantially in a common horizontal plane. Therefore, there is shown one lever only and the rods other than the rod 68 are broken away.

For the purpose of minimizing energy losses due to windage circulation about the inner portions of the blades there is provided an enclosure for the blades. As here shown this enclosure comprises two annular shields or disks 70 which are mounted about and rigidly secured at their inner edges to the outer portion 43 of the hub. These disks extend outwardly on opposite sides of the shank 40 of the blades to the circumferential wall of the body (Fig. 11). The outer edges of the disks are connected one with the other by a circumferential closure 71 which is provided with openings 72 through which the shanks of the blades extend. The axis or center line of rotation of the blade should be approximately coincident with the line of the center of pressure on the blade, which is usually spaced from the leading edge of the blade approximately one-quarter (¼) of the width of the blade. In the arrangement shown the outer or propelling portion 41 of each blade is of a width substantially greater than the diameter of the shank 40 and the trailing longitudinal edge thereof projects laterally from the blade axis a greater distance than does the leading edge thereof. To reinforce the blade against the stresses to which it is thus subjected the outer portion 41 of the blade is rigidly secured to, and preferably formed integral with, a disk 73 which has on that side thereof opposite the part 41 of the blade a stem 74 which extends into the tubular shank 40 and is rigidly secured thereto, as by bolts or rivets 75. The upper and lower surfaces of the disk 72 are slightly convex and converge outwardly to a round edge as shown at 76. It is desirable that this round edge of the disk 73 should be substantially in line with the closure 71 and that closure should be substantially in line with the outer surfaces of the adjacent portions of the wall of the body, and therefore the circumferential closure 71 is provided with depressed portions 76a to receive the inner convex surfaces of the respective disks 73, the several openings 72 being formed in these depressed portions.

While I prefer a blade of the type above described the blade may take various forms and in Figs. 21, 22 and 23 I have illustrated a blade of more or less conventional form. The wide portion 77 of the blade extends inwardly to a point adjacent the outer member 43 of the hub and is provided with a relatively short shank 78 which is mounted in the hub in the same manner as above described. In Fig. 21 shields 70 are mounted on the hub in the same manner as above described and may or may not be provided with an outer closure for the space between the same, through which the blades would extend. In Fig. 22 the shields are shown at 70a as mounted on the respective portions of the body adjacent the outer wall thereof and extend inwardly therefrom. The shields are provided with circumferential central openings 70b which extend about the hub and permit the rotation of the latter with relation to the stationary shields. In Fig. 23 the shields are omitted.

Preferably a guard is mounted about the end portions of the blades which project beyond the body to protect the blades from damage and to avoid the possibility of injury to persons by the propeller. In the arrangement shown in Figs. 3, 19 and 20 a circumferential guard member 79 extends about the outer ends of the blades, in spaced relation thereto, and is supported on the body by two circumferential series of supporting members or posts 80 the two series of posts being connected with the circumferential member 79 adjacent the respective edges thereof and being rigidly mounted on the respective parts of the body. The supporting members or posts 80 of each series are spaced circumferentially one from the other substantial distances to permit the free flow of air through the blades and at the same time prevent the guard from coming in contact with an exterior object. Both the circumferential member and the posts are of thin construction and are preferably of airfoil shape in cross section. In the present instance, the circumferential member 79 comprises a series of ribs 81 to which the posts 80 are rigidly secured and to which is secured a plurality of circumferential parts 82 which form a support for a cover 83 of fabric, thin metal, or the like. The forward ends of the ribs 81 have their lower edges sloped upwardly and forwardly as shown at 84 to deflect the air below the member 79 in a streamline manner.

The propeller shaft 32 may be driven in any suitable manner. In the arrangement shown in Fig. 4 a gear 84 is rigidly secured to the shaft and meshes with a second gear 85 mounted on a second shaft 86 in a bearing 87 in the supporting bracket 33, and extending forwardly therefrom to an engine 88, as shown in Fig. 3.

The wings 21 may be demountably secured to the body in any suitable manner. As shown in Figs. 12 and 13 there is rigidly secured to each side of the body a relatively short member 90 which preferably comprises the inner end portion of the corresponding wing. Mounted in this inner portion of the two wings are tubular members 91 which, in the present instance, extend through both parts 90 and are adapted to receive elongate studs 92 rigidly secured to the outer portions 21a of the respective wings 21 and thus rigidly support the outer portions on the inner portions. The studs 92 may be secured in the tubular members in any suitable manner as by pins 93 extending through openings 94 and 95 in the tubular members and studs, the pins being accessible from within the body and thus enabling the outer portions of the wings to be quickly and easily attached to or detached from the body. The outer portion of each wing is provided with the usual aileron 96 and flap 97 and means are provided for connecting the ailerons and flaps with actuating devices within the body. In the arrangement shown a tubular member 98 is mounted in the inner portion 90 of each wing and is rotatable therein, the inner ends of the members 98 being spaced one from the other. Mounted within and spaced from each tubular member 98 is a second tubular member 99 which is also rotatable. Mounted in the outer portion of each wing is a pair of telescoping shafts, the outer shaft 100 being secured to the flap 97 and the inner shaft 101 being connected with the aileron 96 and being spaced from the outer shaft. Each pair of shafts project inwardly beyond the outer portion of the corresponding wing and when the same is mounted on the body the outer shaft 100 is inserted between the two tubular sockets 98 and 99 and the inner shaft 101 extends into the inner tubular socket 99. The two shafts are connected with the respective rotatable socket members for rotation therewith and as here shown the outer shaft is connected with the outer socket member 98 by a pin 102 which extends through alined openings in the outer socket member and the outer shaft. In the present instance the pin is carried by a resilient arm 103 one end of which is pivotally mounted on the outer tubular socket at 104 and is provided at its other end with a handle 105 whereby the pin may be easily withdrawn from the socket member and moved to a position out of line with the latter. The inner socket member 99 is connected with the inner shaft 101 by a similar pin 106 carried by a similar resilient arm 107. Thus when the shafts are to be inserted in the socket members the pins are withdrawn and positioned at one side of the socket members until the shafts have been fully inserted and the openings therein brought into line with the openings in the socket members after which the pins are moved into line with the openings and the resiliency of the arms 103 and 107 inserts the pins in the respective openings and retains the same thereon.

The several socket members may be operatively connected with actuating devices in the body in any suitable manner. As here shown, each inner socket member 99 is provided with a crank arm 108 and each outer socket member 98 is provided with a crank arm 109. Inasmuch as the ailerons move in opposite directions the crank arms 108 on the socket members 99 for the aileron shafts 101 must be arranged to rotate those shafts simultaneously in opposite directions. The arrangement of the present connections between the crank arms 108 and the actuating devices is such that the crank arms extend in opposite directions from the aileron shaft (Figs. 12 and 14). The crank arms 108 are connected by links 109a with crank arms 110 on a shaft 111 which is journaled in bearings 112 carried by fixed supports 113. A crank arm 114 on the shaft 111 is connected with an actuating rod 115 which extends forwardly in the body and is provided with a suitable actuating member such as a lever similar to that shown at 69. Each crank arm 109 on the outer tubular socket members 98 is connected by a link 116 with a crank arm 117 secured to a shaft 118 mounted in a fixed bearing 119. A crank arm 120 on the shaft 118 is connected with an actuating rod 121 which also extends forwardly in the body and is connected with a suitable actuating member. Thus the movement of the actuating member for the ailerons will move the latter simultaneously in opposite directions, while the movement of the actuating device for the flaps will move the latter simultaneously in the same direction.

The devices for controlling the direction of movement of the vehicle in the air, that is a rudder and elevators, are arranged in the forward portion of the body and it is desirable that the connections between the actuating devices and the controlling members shall extend through the hub of the propeller. In the present arrangement a tubular rod 135 extends through tubular connecting member 26, projects upon both ends of the latter and is rotatably mounted therein by ball bearings one of which is shown at 136. The forward end of the rod 135 has secured thereto a crank arm 137 which is connected by a link 138 with one arm 139 of a bell crank, the other arm 140 of which is connected by a rod 141 with an actuating member in the forward end of the body, such as a lever similar to that shown at 69. At its rear end the rod 135 is provided with a crank arm 142 which is connected by a link 143 with one arm of a bell crank 144 the other arm 145 of which is connected by a rod 146 with a crank arm 147 secured to a shaft 148 (Figs. 3 and 6) which may be connected with the elevators in the usual or any suitable manner.

A rod 149 extends through and beyond the ends of the tubular rod 135 and is rotatably supported therein by bearings, one of which is shown at 150. A crank arm 151 on the forward end of the rod 149 is connected by a link 152 and a bell crank 153 with a rod 154 which also extends to the forward portion of the body and is connected with a suitable actuating member. A crank arm 155 secured to the rear end of the rod 149 is connected by a link 156 and a bell crank 157 with a rod 158 which extends rearwardly and is connected with a crank arm 159 on the end of the upright rudder shaft 160.

The means for connecting the two parts of the body one with the other may be arranged either within or without the body and in Figs. 24 to 27 there is shown an exterior connecting structure which extends circumferentially about the adjacent ends of the two parts of the body and is rigidly secured at its ends with the respective parts of the body. As there shown the connecting structure comprises a circumferential series of curved bars 161 which extend across the space between the two parts of the body and the end portions of which extend into the respective parts of the body and are rigidly secured to frame elements 162 within the body. In the arrangement shown attaching devices 163 are rigidly secured to, and may be formed integral with, the frame elements and are so arranged that the ends of the connecting bars may be secured thereto by bolts 164. The intermediate portions of the bars are spaced radially one from the other and a circumferential band 165 is rigidly connected with the intermediate portions of the bars in spaced relation to the tips of the blades, thus the structure as a whole constitutes a rigid connection between the two parts of the body and a guard for the projecting portions of the blades. Those parts of the band 165 which are between adjacent bars 161 are preferably of airfoil cross section and parts which are secured to the bars are rectangular in cross section and are seated in recesses 161a, the recesses being preferably a depth less than the thickness of the band.

When the demountable wings have been detached from the body the vehicle may be propelled by the propeller on land, the support for the front wheel 25 of the landing gear extending into the forward portion of the body and being provided with means for moving the same about an upright axis to steer the vehicle upon the ground, the steering means being shown, for the purpose of illustration, as a lever 122. The rear wheels 24 may be connected with the body in any suitable manner but preferably they are connected by shock absorbers 123 with the inner fixed portions 90 of the wings. It is also desirable that when a water cooled engine is employed radiators 124 shall be mounted on the respective fixed parts 90 of the wings.

The vehicle can be operated as an automobile without removing the rudder 22 and the elevators 23 but preferably these parts are removed. For this purpose the tail end 125 of the body is made separate from the main portion 20b and is detachably secured thereto. As best shown in Fig.

6 the adjacent ends of the two parts of the rear portion of the body, 20b, are provided with circumferential connecting members or ribs 126 and 127 and are provided with interlocking parts to rigidly secure the same one to the other. In the present instance the members 126 and 127 are rabbeted at 128 to provide the same with overlapping parts and these overlapping parts are preferably slightly inclined to cause them to engage with a wedging action. The two members may be retained in interlocking engagement in any suitable manner as by spring fingers 129 rigidly secured to the annular member 127 and extending rearwardly therefrom. Each finger is provided at its rear end with a head 130 to engage the rear surface of the annular member 126 and lock the two members together, the spring fingers being provided in sufficient number to firmly connect the two parts. Preferably the head 130 has at its rear end a sloping outer surface adapted to engage a sloping surface 131 on the member 126 as the latter is moved into engagement with the member 127 and thus depress the head 130 until the two parts are in proper interlocking positions. The wall of the body may be provided adjacent the annular member 126 with openings 132 through which the hand or a suitable implement may be inserted to disengage the spring arms from the member 126. The actuating rods for the rudder and elevator are also divided into two parts and separately connected one with the other as shown at 133, a normally closed opening 134 being formed in the body to permit access to these connections. Preferably a cross bar 135 is secured to the annular member 127 and provided with openings through which the actuating rods extend and which serve to support the forward portions of the actuating rods when the tail structure has been removed. When the tail structure has been removed it is preferable to provide a relatively short closure for the open rear end of the body. For that purpose a convex member 125a is provided which may be connected with the body in the same manner that the tail structure 125 is connected therewith (Fig. 18).

While I have shown and described one embodiment of my invention, together with certain modifications thereof, I wish it to be understood that I do not desire to be limited to the details thereof as various modifications may occur to a person skilled in the art.

Having now fully described my invention what I claim as new and desire to secure by Letters Patent is:

1. A vehicle comprising a body divided transversely into two parts, means on the outer side of said body for connecting said parts one to the other in longitudinally spaced relation including a rigid structure extending about and rigidly secured to the adjacent end portions of the two parts of said body and extending across the space between said parts with its intermediate portion spaced outwardly from the adjacent ends of said parts, a propeller rotatably supported in said body and having blades revoluble in the space between said parts of said body and extending outwardly beyond said body, and means for rotating said propeller.

2. A vehicle comprising a body divided transversely into two parts, means on the outer side of said body for connecting said parts one to the other in longitudinally spaced relation, including an annular structure extending about the adjacent ends of said parts of said body and means for rigidly securing said structure to both parts of said body with an intermediate portion thereof in radially spaced relation to said body, a propeller rotatably supported in said body and having blades revoluble in the space between said parts of said body and extending outwardly beyond said body, and means for rotating said propeller.

3. A vehicle comprising a body divided transversely into two parts, means on the outer side of said body for connecting said parts one to the other in longitudinally spaced relation, including a circumferential series of elongate members extending across the space between the two parts of said body with the intermediate portions thereof spaced outwardly from the adjacent ends of said parts of said body, means for rigidly connecting the end portions of said members with the respective parts of said body, and a continuous cover extending about said series of members on both the inner and outer sides thereof, a propeller rotatably supported in said body and having blades revoluble in the space between said parts of said body, and means for rotating said propeller.

4. A vehicle comprising an elongate body having a continuous circumferential opening, a structure within said body rigidly secured to said body on both sides of said circumferential opening, a propeller supported for rotation about said structure and having blades extending through and beyond said circumferential opening, means for rotating said propeller, and a guard for said blades comprising a circumferential member extending about the ends of said blades and two series of circumferentially spaced posts connecting said member with the respective parts of said body.

5. A vehicle comprising a body divided transversely into two parts, means for rigidly connecting said parts one to the other with an unobstructed space between the adjacent ends thereof, a propeller rotatably mounted in said body and including a hub and a plurality of blades, each blade having a shank mounted in said hub and extending through the space between said parts of said body to a point adjacent the wall of said body, and an outer portion connected with the outer end of said shank and extending beyond said wall of said body, annular shields secured to said hub and extending outwardly on opposite sides of said blades, a circumferential closure secured to the outer edge portions of said shields, said closure having therein openings through which the shanks of said blades extend and a depressed portion surrounding each opening, a transverse disk interposed between and rigid with the outer portion and shank of each blade and supported in the corresponding depression, said disk having convex inner and outer surfaces and a rounded circumferential edge portion, said edge portion being substantially in line with the rim of said closure, and means for rotating said propeller.

6. A vehicle comprising an elongate body having a continuous circumferential opening, a structure within said body rigidly secured to said body on both sides of said circumferential opening, a propeller supported for rotation about said structure and having blades extending through and beyond said circumferential opening, means for rotating said propeller, and a guard for said blades comprising a circumferential member extending about the ends of said blades and having the lower surface of its forward edge portion sloping upwardly and forwardly, and circumferentially spaced members rigidly securing said circumferential member to said body on the respective sides of said opening.

EDWARD T. TURNER.

REFERENCES CITED

The following references are of record in the file of this patent:

UNITED STATES PATENTS

| Number | Name | Date |
|---|---|---|
| 1,136,560 | Smith | Apr. 20, 1915 |
| 1,247,412 | Lake | Nov. 20, 1917 |
| 1,262,660 | Gallaudet | Apr. 16, 1918 |
| 1,340,450 | Kleidman | May 18, 1920 |
| 1,605,045 | Mader | Nov. 2, 1926 |
| 1,804,817 | Silverman | May 12, 1931 |
| 1,831,134 | Paulson | Nov. 10, 1931 |
| 1,839,895 | Rossi | Jan. 5, 1932 |
| 1,861,150 | Zipay | May 31, 1932 |
| 2,026,885 | Goddard | Jan. 7, 1936 |
| 2,215,003 | Johnson | Sept. 17, 1940 |
| 2,241,577 | Beals | May 13, 1941 |
| 2,406,625 | Oglesby | Aug. 27, 1946 |
| 2,420,462 | Carr | May 13, 1947 |
| 2,434,068 | Geisse | Jan. 6, 1948 |
| 2,446,528 | Clark | Aug. 10, 1948 |
| 2,532,159 | Fulton | Nov. 28, 1950 |

FOREIGN PATENTS

| Number | Country | Date |
|---|---|---|
| 568,548 | Great Britain | Apr. 10, 1945 |
| 818,673 | France | June 21, 1937 |
| 825,627 | France | Dec. 16, 1937 |